March 6, 1928

Re. 16,894

A. P. BRUSH

INTERNAL COMBUSTION ENGINE

Original Filed Feb. 16, 1918

Inventor

Alanson P. Brush

By

Whittemore Hulbert

Whittemore & Belknap

Attorneys

Reissued Mar. 6, 1928. Re. 16,894

UNITED STATES PATENT OFFICE.

ALANSON P. BRUSH, OF DETROIT, MICHIGAN, ASSIGNOR TO THE SIMPLEX PISTON RING CO. OF AMERICA, INC., OF CLEVELAND, OHIO, A CORPORATION OF OHIO.

INTERNAL-COMBUSTION ENGINE.

Original No. 1,299,674, dated April 8, 1919, Serial No. 217,652, filed February 16, 1918. Application for reissue filed August 29, 1927. Serial No. 216,323.

This invention relates to a certain new and useful improvement in internal combustion engines, of which the following is a full, clear, and exact description.

The object of this invention is to prevent what is called "piston slap" in internal combustion engines. In such engines there must be considerable working clearance between the piston and the cylinder in order that the piston may operate properly therein. The pressure on the piston and the reversal of angularity of the connecting rod causes such pistons to press first against one side of the cylinder and then against the other side diametrically across the cylinder at right angles to the axis of the piston wrist pin. Of course, the movement of the piston is small; but nevertheless, in many engines, when the piston reverses its motion, it moves this short distance very rapidly, and in a substantially straight path at right angles to the axis of the wrist pin, which connects the connecting rod with the piston; and the result is that the piston, when it comes against the opposite side of the cylinder, makes a noise which is known as piston slap.

The present invention aims to cause the piston in moving from one side of the cylinder to the other to move, not in the straight path at right angles to said connecting rod pin, but in a curved path so that the line of contact between the piston and the cylinder moves around the cylindrical wall of the cylinder from one side thereof to the other. To effect this result according to this invention one employs means for yieldingly pressing the piston at all times lengthwise of the piston wrist pin and toward one end thereof.

The invention consists in the construction and combination of parts shown in the drawings and hereinafter described and pointed out definitely in the appended claims.

Figure 1:
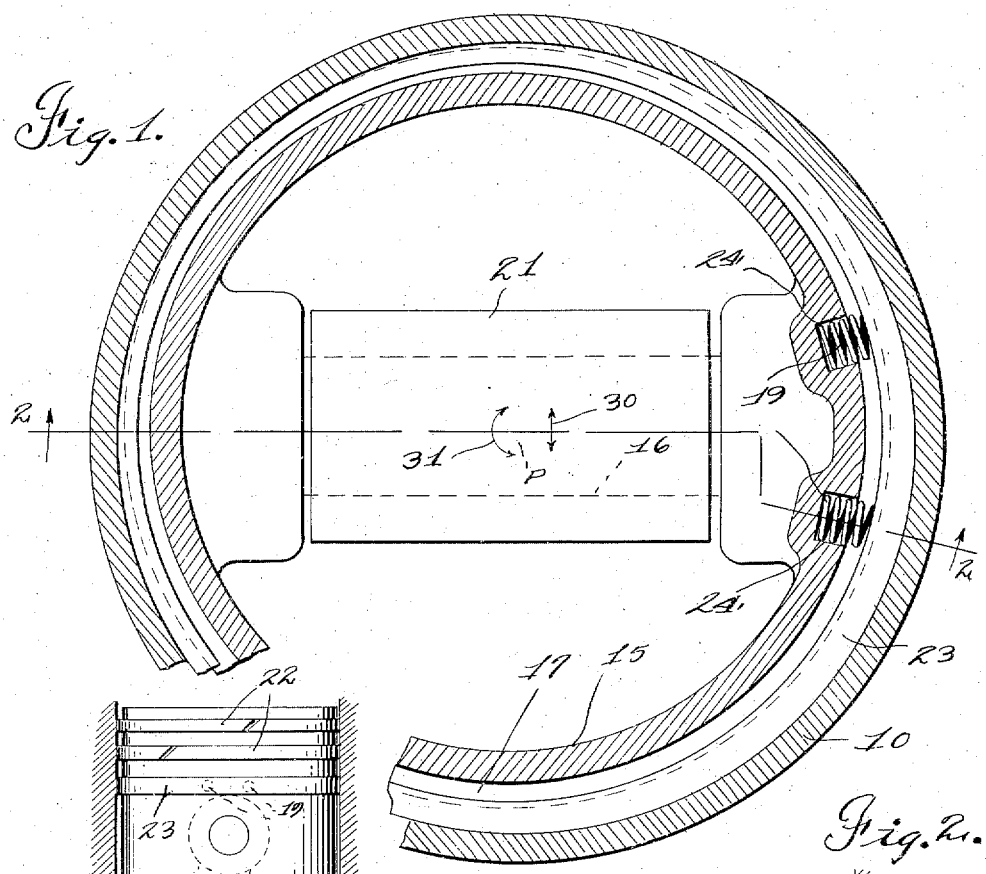
Figure 1 is a sectional plan view in the plane 1—1 on Figure 2.
Figure 2:
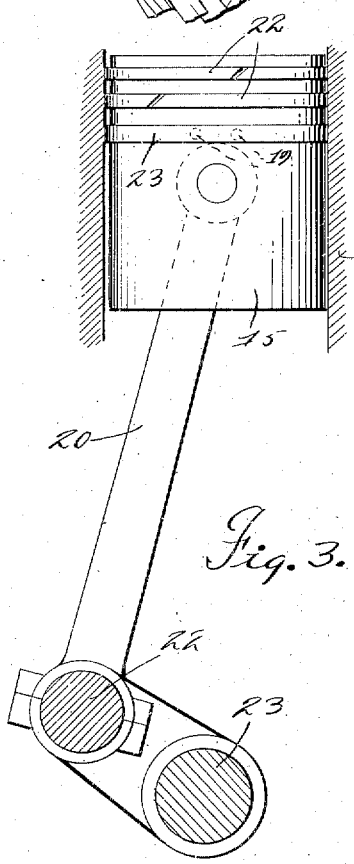
Figure 2 is a longitudinal section in the plane indicated by line 2—2 on Figure 1.
Figure 3:
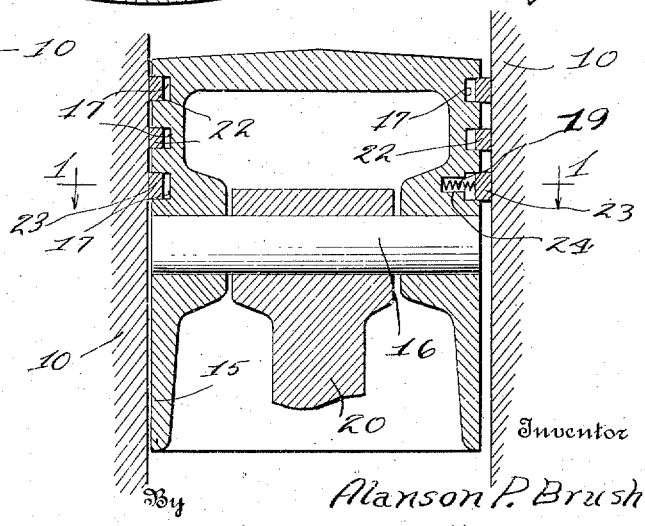
Figure 3 is a side elevation of the piston and connecting rod.

The cylinder 10 is of the usual construction. So also is the piston 15, which piston is so fitted to the cylinder as to have the usual operative clearance. 16 represents the wrist pin carried by the piston, and 20 the connecting rod whose lower end is journaled on the crank pin 22 of the crank shaft 23, and whose upper end is journaled on the wrist pin 16. To enable the piston to move in the desired circular path, the piston must be permitted a short movement lengthwise of said wrist pin relative to the connecting rod. To permit such movement there must be sufficient clearance between the piston and the ends of the connecting rod bearing 21, and the pin must be capable of moving endwise relatively to either the piston or connecting rod.

The piston is formed with the usual annular grooves 17, and these contain the usual metallic split spring piston rings 22 and 23.

In order to impart to the piston the yielding pressure lengthwise of the wrist pin 16 required to produce the desired result, I prefer to utilize the lower piston ring 23 and to employ, in connection with it, two coil springs 19, set in suitable recesses 24 in the side of the piston behind the lower piston ring, one on each side of but fairly close to the axis of the wrist pin. The resultant action of these two springs is to yieldingly push the piston in the direction of the wrist pin and toward the opposite end thereof to that to which said coil springs are adjacent. These springs are not strong enough to overcome the combined action of the pressure on the piston and the angularity of the connecting rod in causing the piston to contact first with one side and then with the other side of the cylinder. But they are strong enough to and do act at the instant when the piston is at either end of its stroke, and the angularity of the connecting rod is changing to push the piston lengthwise of the wrist pin. The result of this action will be that the piston, instead of moving directly across the cylinder in a path at right angles to the wrist pin, such for example, as indicated by the straight double arrow 30 in Figure 1, it will move in substantially the path indicated by the curved double arrow 31 on Figure 1, said piston substantially maintaining a contact with the inner wall of the cylinder from one side thereof to the other. Of course, this prevents the noise which is, as before stated, known as piston slap.

It is to be understood that the invention is not limited to the precise embodiment of the invention which is shown in the drawing; because it is obvious that various other specific instrumentalities may be employed to yieldingly push the piston lengthwise of the wrist pin and in which the reaction is between the piston and a member radially slidable in a groove therein and bearing against the cylinder wall.

What I claim as my invention is:

1. In an engine, the combination of a cylinder, a piston therein having operative clearance, a connecting rod, a wrist pin which pivotally connects the connecting rod with the piston, said piston having a circumferentially extending groove therein adjacent said wrist pin, a member radially movable in said groove peripherally bearing against the cylinder wall and resilient means between said member and piston yieldingly tending to push the piston across the cylinder in one direction of the length of said connecting rod pin.

2. In an engine, the combination of a cylinder, a piston therein having operative clearance, a connecting rod, a wrist pin which pivotally connects the connecting rod with the piston, said piston having annular piston ring grooves, one of which is adjacent the wrist pin, piston rings in said grooves and a spring or springs adjacent one end of the wrist pin acting to push the piston ring against the adjacent surface of the cylinder and a piston in the opposite direction lengthwise of the wrist pin.

In testimony whereof I affix my signature.

ALANSON P. BRUSH.